United States Patent
Etoh et al.

(10) Patent No.: US 8,180,738 B2
(45) Date of Patent: May 15, 2012

(54) MEMORY CONTROLLER, NONVOLATILE STORAGE DEVICE, AND NONVOLATILE STORAGE DEVICE SYSTEM

(75) Inventors: Hiroki Etoh, Osaka (JP); Shinji Inoue, Osaka (JP); Masahiro Nakanishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 651 days.

(21) Appl. No.: 12/304,668

(22) PCT Filed: Jun. 15, 2007

(86) PCT No.: PCT/JP2007/062107
§ 371 (c)(1),
(2), (4) Date: Dec. 12, 2008

(87) PCT Pub. No.: WO2007/145316
PCT Pub. Date: Dec. 21, 2007

(65) Prior Publication Data
US 2010/0005109 A1    Jan. 7, 2010

(30) Foreign Application Priority Data

Jun. 15, 2006    (JP) .................................. 2006-165859

(51) Int. Cl.
G06F 7/00       (2006.01)
G06F 17/00      (2006.01)
G06F 17/30      (2006.01)
(52) U.S. Cl. ..................... 707/687; 707/705; 707/824
(58) Field of Classification Search .................. 707/824, 707/687, 705
See application file for complete search history.

(56) References Cited

U.S. PATENT DOCUMENTS

| | | | | | |
|---|---|---|---|---|---|
| 5,559,957 | A | * | 9/1996 | Balk | 714/23 |
| 5,974,426 | A | * | 10/1999 | Lee et al. | 1/1 |
| 6,189,016 | B1 | * | 2/2001 | Cabrera et al. | 1/1 |
| 6,636,773 | B1 | | 10/2003 | Tagawa et al. | |
| 6,647,496 | B1 | | 11/2003 | Tagawa et al. | |
| 6,779,116 | B2 | | 8/2004 | Tagawa et al. | |

(Continued)

FOREIGN PATENT DOCUMENTS

EP      1232776 A      8/2002

(Continued)

OTHER PUBLICATIONS

English language Abstract of JP 2006-011818 A.

(Continued)

*Primary Examiner* — Charles Lu
(74) *Attorney, Agent, or Firm* — Greenblum & Bernstein, P.L.C.

(57) ABSTRACT

A memory controller, a nonvolatile storage device and a nonvolatile storage device system are provided, in which the matching check between content data and meta data can be simplified, a starting time can be shortened, and further, a host device side can provide users with a common GUI without being conscious of the Usage Rule including an encryption method for copyright protection and a copyright protection method and a content management. A write status holding unit that holds write status information to identify the content data being written, and a content management unit that manages the content data and the meta data are included. The content management unit eliminates mismatch between the content data and the meta data based on the write status information. Further, a GUI script generating unit is included which generates a script describing the screen display contents in accordance with a request from the host device for the content data.

18 Claims, 12 Drawing Sheets

U.S. PATENT DOCUMENTS

| | | | |
|---|---|---|---|
| 6,832,293 | B1 | 12/2004 | Tagawa et al. |
| 6,865,431 | B1 | 3/2005 | Hirota et al. |
| 7,010,372 | B2 | 3/2006 | Tagawa et al. |
| 7,212,875 | B2 | 5/2007 | Tagawa et al. |
| 7,392,342 | B2 | 6/2008 | Tagawa et al. |
| 7,471,878 | B2 | 12/2008 | Tagawa et al. |
| 2002/0112236 | A1 | 8/2002 | Sukeda et al. |
| 2002/0194380 | A1* | 12/2002 | Sullivan et al. ............... 709/246 |
| 2004/0177216 | A1* | 9/2004 | Asari et al. .................... 711/103 |
| 2005/0192686 | A1 | 9/2005 | Hirota et al. |
| 2005/0289291 | A1 | 12/2005 | Takahashi |
| 2006/0069691 | A1 | 3/2006 | Kawai |
| 2006/0195708 | A1 | 8/2006 | Kato et al. |
| 2007/0277076 | A1 | 11/2007 | Tamura et al. |
| 2008/0028129 | A1 | 1/2008 | Nakanishi et al. |
| 2008/0049504 | A1 | 2/2008 | Kasahara et al. |
| 2008/0228300 | A1 | 9/2008 | Tagawa et al. |

FOREIGN PATENT DOCUMENTS

| | | | |
|---|---|---|---|
| EP | 1619579 | A | 1/2006 |
| EP | 1643366 | A | 4/2006 |
| JP | 2001-084180 | A | 3/2001 |
| JP | 2001-249693 | A | 9/2001 |
| JP | 2002-245378 | A | 8/2002 |
| JP | 2006-011818 | A | 1/2006 |
| JP | 2006-106882 | A | 4/2006 |
| JP | 2006-120217 | A | 5/2006 |

OTHER PUBLICATIONS

English language Abstract of JP 2006-120217 A.
English language Abstract of JP 2001-084180 A.
English language Abstract of JP 2002-245378 A.
English language Abstract of JP 2006-106882 A.
English language Abstract of JP 2001-249693 A.

* cited by examiner

Fig.5

| UID | NAME | TYPE | SUBTYPE | DRM | KEY |
|---|---|---|---|---|---|
| 1 | Movie001 | MOVIE | MPEG2 | Move | abc2348d |
| 2 | Movie002 | MOVIE | MPEG4 | Copy | 1234defa |
| 3 | Movie003 | MOVIE | MPEG2 | Play1 time | a1b3d45e |
| 4 | Movie004 | MOVIE | DV | Free | |
| 5 | Text005 | TEXT | PDF | Print3 times | abcdef12 |
| 6 | Audio006 | AUDIO | MP3 | Copy | fedcba98 |

Fig.6

```
<menu>
<item uid=001>
<thumbnail onClick="play.xml?uid=001">
<location>
<horizontal>250</horizontal>
<vertical>100</vertical>
</location>
</thumbnail>
<text>Movie001</text>
<information></information>
<input name="delete" onClick="delete.xml?uid=001">DELETE</input>
<input name="rename" onClick="rename.xml?uid=001">RENAME</input>
<input name="move" onClick="rename.xml?uid=001">MOVE</input>
</item>
...
</menu>
```

MEMORY CONTROLLER, NONVOLATILE STORAGE DEVICE, AND NONVOLATILE STORAGE DEVICE SYSTEM

TECHNICAL FIELD

The present invention relates to a nonvolatile storage device such as a semiconductor memory card having a nonvolatile memory, a memory controller for controlling the same, and a nonvolatile storage device system which includes an access device as constituent in addition to the nonvolatile storage device.

BACKGROUND ART

In recent years, video, audio or the like contents have come to be handled as digital data due to the technological progress. In order to make video and audio digital data in portable form, a recording medium such as a semiconductor memory, a magnetic disk, a magnetooptic disk or a hard disk is used as a storage medium. Conventionally, the management of data stored in a information recording area of the recording medium such as the semiconductor memory, the magnetic disk or the magnetooptic disk is realized by a file system. In the file system, the information recording area is segmented into sectors which are minimum access units and clusters which are sets of the sectors, and one or more clusters are managed as a file. Also, the title thereof and the name of the artist with regard to the video or audio contents, the time search table, and the correlation between the video/audio contents are called meta data. In the file system, these meta data and video contents are also handled as a file on the file system. In order to specify the format of the contents in the storage medium and the contents of the file of the meta data, an application standard has been specified. In the case of the SD (Secure Digital) memory card, for example, the standardization is under way in SDA (SD Association).

Patent Document 1, etc., for example, is related to the specification of such an application.
Patent Document 1: JP-A-2001-249693

DISCLOSURE OF INVENTION

Problem to be Solved by the Invention

A host device side using a storage medium has so far individually developed a content management portion based on the standard specifying only a manner in which files are arranged and a data arrangement in the file for the storage medium, and therefore, the problem described below has been encountered.

Since only the file arrangement is specified, the contents of the meta data are changed by the host device side. Therefore, taking into consideration a case in which one of the file storing the meta data and the file storing the video/audio contents is deleted, the portion to be changed is required to be consciously developed by the device side using the storage medium about a Usage Rule including an encryption method for copyright protection and a copyright protection method and a content management, recorded in the meta data.

The device uniquely interprets a file format of the meta data and displays the contents and the like. Therefore, a difference has occurred in the content display and operability between the devices.

Also, since the portion to be processed is required to be developed for the host device side, repackaging is required in accordance with a corresponding standard each time the system configuration of the device or the like is changed. At the same time, a process for the portion relating to the copyright protection is required to be executed on an object subjected to an anti-tamper registering process to improve confidentiality. The execution of the anti-tamper registering process for all the portions subjected to the copyright protection process on the host device side, however, requires a very high development cost for packaging while at the same time leading to an increased execution processing time.

Further, the fact that a packaging difference for a content management method or a method for resolving an error such as a power interruption occurs between the host devices and that files are deleted by the devices such as a PC in which the files can be freely deleted sometimes causes a mismatch between the content data and the meta data. Taking a case in which such mismatch occurs into consideration, the host device is required to check the matching in an initialization process for power-on. As a result, a problem has been posed that the time from the power-on till when the shooting becomes possible, i.e. the starting time become longer.

Now, the problem point relating to the aforementioned mismatch for the conventional nonvolatile storage device system shown in FIG. 12 is described in detail. First, let us consider a case in which a memory card 1230 is used by being mounted on a host device 1220 after being used by being mounted on a host device 1200. Content management units 1201 and 1211 are assumed to have a function of writing the content data and the meta data on the content data as a pair in the memory card 1230 in a content data write operation. A content management unit 1221, on the other hand, is assumed to be capable of writing only the content data in the content data write operation, i.e. have no function of writing the meta data on the content data in a memory area 1232.

In the case where the memory card 1230 is mounted on the host device 1200 and the host device 1200 writes the content data in the memory card 1230, the content data is written in the memory area 1231 and the meta data on the content data is written in the memory area 1232 by the content management unit 1201. In the process, the matching between the content data and the meta data is maintained. After that, in the case where the memory card 1230 is mounted on the host device 1220 and the host device 1220 rewrites the content data in the memory card 1230, only the content data stored in the memory area 1231 is rewritten by the content management unit 1221. Therefore, the matching between the content data in the memory area 1231 and the meta data in the memory area 1232 cannot be maintained any longer. After that, in the case where the memory card 1230 is used by being mounted on the host device 1200 again, the host device 1200 cannot know whether the matching between the content data in the memory area 1231 and the meta data in the memory area 1232 is maintained or not. As a result, the host device 1200 is required to check the matching between all the content data and the meta data stored in the memory card 1230 without fail including a case where the matching is not destroyed by the host device 1220.

Next, let us consider a case in which the memory card 1230 is used by being mounted on the host device 1210 after being used by being mounted on the host device 1200. The content management units 1201 and 1211 are assumed to have the function of writing the content data and the meta data on the content data as a pair in the memory card 1230 in the content data write operation as described above. However, the content management unit 1201 is assumed to be so packaged as to resolve the error such as the power interruption positively, i.e. to avoid the mismatch between the content data and the meta data even during an error. The content management unit 1211, on the other hand, is assumed to be so packaged as not to resolve the error positively.

In the case where the memory card 1230 is mounted on the host device 1200 and the host device 1200 writes the content data in the memory card 1230, the content data is written in the memory area 1231 and the meta data on the content data is written in the memory area 1232 by the content management unit 1201. In the case where the error such as the power interruption occurs, the content management unit 1201 ends the write operation in a state where the pair of the content data and the meta data is written correctly as valid or the pair is invalidated, i.e. in a state where the matching of the pair is maintained. After that, in the case where the memory card 1230 is mounted on the host device 1210, and the error such as the power interruption occurs at the time of writing the content data similarly, the matching may not be maintained between the content data and the meta data on the content data written in the memory card 1230 by the content management unit 1211. In the case where the memory card 1230 is used again subsequently by being mounted on the host device 1200, the host device 1200 cannot know that the content data and the meta data between which the matching is not maintained exist in the memory card 1230. As a result, the host device 1200 is required to check the matching between all the content data and the meta data stored in the memory card 1230 without fail.

As described above, in the case where a content management function is provided on the host device side, the difference in the content data recording method and the error resolving method according to the type of the host device makes it necessary to check the matching even in the case where the matching check would otherwise not be required. As a result, a problem has been posed that the starting time is delayed.

In view of the problem points described above or especially the problem of the starting time delay due to the matching check, the present invention provides a memory controller, a nonvolatile storage device and a nonvolatile storage device system which can shorten the starting time by simplifying the matching check between the content data and the meta data and which can further provide the user with a common GUI without the need of being conscious of the Usage Rule including the encryption method for copyright protection and the copyright protection method and the content management on the host device side.

Means for Solving the Problem

In order to achieve the object described above, according to the present invention, there is provided a technical means described below.

Specifically, the technical means according to the present invention provides a memory controller connected to an nonvolatile memory, for reading or writing the content data and the meta data on the content data in accordance with an access command from an external host device, the memory controller including a content management unit that manages the content data and the meta data, wherein the content management unit eliminates the mismatch between the content data and the meta data on the content data, based on write status information which is held in the nonvolatile memory for identifying the content data being written.

Also, the technical means according to the present invention provides a memory controller connected to a nonvolatile memory, for reading and writing the content data and the meta data on the content data in accordance with an access command from an external host device, including a write status holding unit that holds write status information for identifying the content data being written and a content management unit that manages the content data and the meta data, wherein the content management unit eliminates the mismatch between the content data and the meta data on the content data based on the write status information.

Incidentally, the content management unit, upon judgment that the content data and the meta data on the content data may be mismatched, based on the write status information, may delete the content data and the meta data already written.

Incidentally, upon judgment that the content data and the meta data on the content data may be mismatched, based on the write status information, the content management unit may request the retransmission and write the content data and the meta data thus retransmitted if retransmittable by the host device, and may delete the content data and the meta data already written if not retransmittable by the host device.

Incidentally, the write status information may include a device ID of the host device.

Incidentally, the memory controller may further include a GUI scrip generating unit that generates the script describing the screen display contents in accordance with the content data request from the host device.

Incidentally, the write status information may be a content ID.

Also, the technical means according to the present invention provides a nonvolatile storage device for reading and writing the content data and the meta data on the content data in accordance with an access command from an external host device, including a nonvolatile memory for storing the content data, the meta data, and write status information for identifying the content data being written and a memory controller for reading and writing the content data and the meta data from and into the nonvolatile memory, the memory controller including a content management unit that manages the content data and the meta data, wherein the content management unit eliminates the mismatch between the content data and the meta data on the content data based on the write status information.

Also, the technical means according to the present invention provides a nonvolatile storage device for reading and writing the content data and the meta data on the content data in accordance with an access command from an external host device, including a nonvolatile memory for storing the content data and the meta data and a memory controller for reading and writing the content data and the meta data from and into the nonvolatile memory, the memory controller including a write status holding unit that holds the write status information for identifying the content data being written and a content management unit that manages the content data and the meta data, wherein the content management unit eliminates the mismatch between the content data and the meta data on the content data based on the write status information.

Incidentally, the content management unit, upon judgment that the content data and the meta data on the content data may be mismatched, based on the write status information, may delete the content data and the meta data already written.

Incidentally, upon judgment that the content data and the meta data on the content data may be mismatched, based on the write status information, the content management unit may request the retransmission and write the content data and the meta data thus retransmitted in the case where the host device is capable of retransmission, and may delete the content data and the meta data already written in the case where the host device is incapable of retransmission.

Incidentally, the write status information may include the device ID of the host device.

Incidentally, the memory controller may further include GUI script generating unit that generates a script describing the screen display contents in accordance with the content data request from the host device.

Incidentally, the write status information may be a content ID.

Also, the technical means according to the present invention provides a nonvolatile storage device system including a host device and a nonvolatile storage device for reading and writing the content data and the meta data on the content data in accordance with an access command from the host device, wherein the nonvolatile storage device includes a nonvolatile memory for storing the content data, the meta data and write status information for identifying the content data being written and a memory controller for reading and writing the content data and the meta data from and into the nonvolatile memory, and wherein the memory controller includes a content management unit that manages the content data and the meta data, wherein the content management unit eliminates the mismatch between the content data and the meta data on the content data based on the write status information.

Also, the technical means according to the present invention provides a nonvolatile storage device system including a host device and a nonvolatile storage device for reading and writing the content data and the meta data on the content data in accordance with an access command from the host device, wherein the nonvolatile storage device includes a nonvolatile memory for storing the content data and the meta data and a memory controller for reading and writing the content data and the meta data from and into the nonvolatile memory, and wherein the memory controller includes a write status holding unit that holds the write status information for identifying the content data being written and a content management unit that manages the content data and the meta data, wherein the content management unit eliminates the mismatch between the content data and the meta data on the content data based on the write status information.

Incidentally, the content management unit, upon judgment that the content data and the meta data on the content data may be mismatched, based on the write status information, may delete the content data and the meta data already written.

Incidentally, upon judgment that the content data and the meta data on the content data may be mismatched, based on the write status information, the content management unit may request the retransmission and write the content data and the meta data thus retransmitted in the case where the host device is capable of retransmission, and may delete the content data and the meta data already written in the case where the host device is incapable of retransmission.

Incidentally, the write status information may include the device ID of the host device.

Incidentally, the memory controller may further include a GUI script generating unit that generates the script describing the screen display contents in accordance with the content data request from the host device.

Incidentally, the write status information may be a content ID.

Effects of the Invention

According to the present invention, the provision of the content management unit in the memory controller makes it possible to reduce the originally unrequired matching check which is caused by the difference in the recording method of the content management unit or the error resolving method conventionally included in the host device. Further, since the matching between the content data and the meta data on the content data corresponding to the content ID is checked based on the content ID held in the write status holding unit, the content data already written at the time of occurrence of the error such as the power interruption can be specified, thereby making it possible to eliminate the mismatch of the content data, etc. Also, the host device side can provide the user with a common GUI without the need of being conscious of the Usage Rule including the encryption method for copyright protection and the copyright protection method and the content management. Also, the content management required for each application is not required to be developed or packaged by the device side, thereby making it possible to develop an inexpensive device for handling the video and audio data.

BRIEF DESCRIPTION OF DRAWINGS

FIG. 5 is a schematic diagram showing an example of meta data accompanying the contents stored in meta data storage unit of the nonvolatile storage device according to the present invention.

FIG. 6 is a diagram showing the structure of an example of the script indicating a content management GUI generated in the nonvolatile storage device according to the present invention.

DESCRIPTION OF REFERENCE NUMERALS

Figure 1:
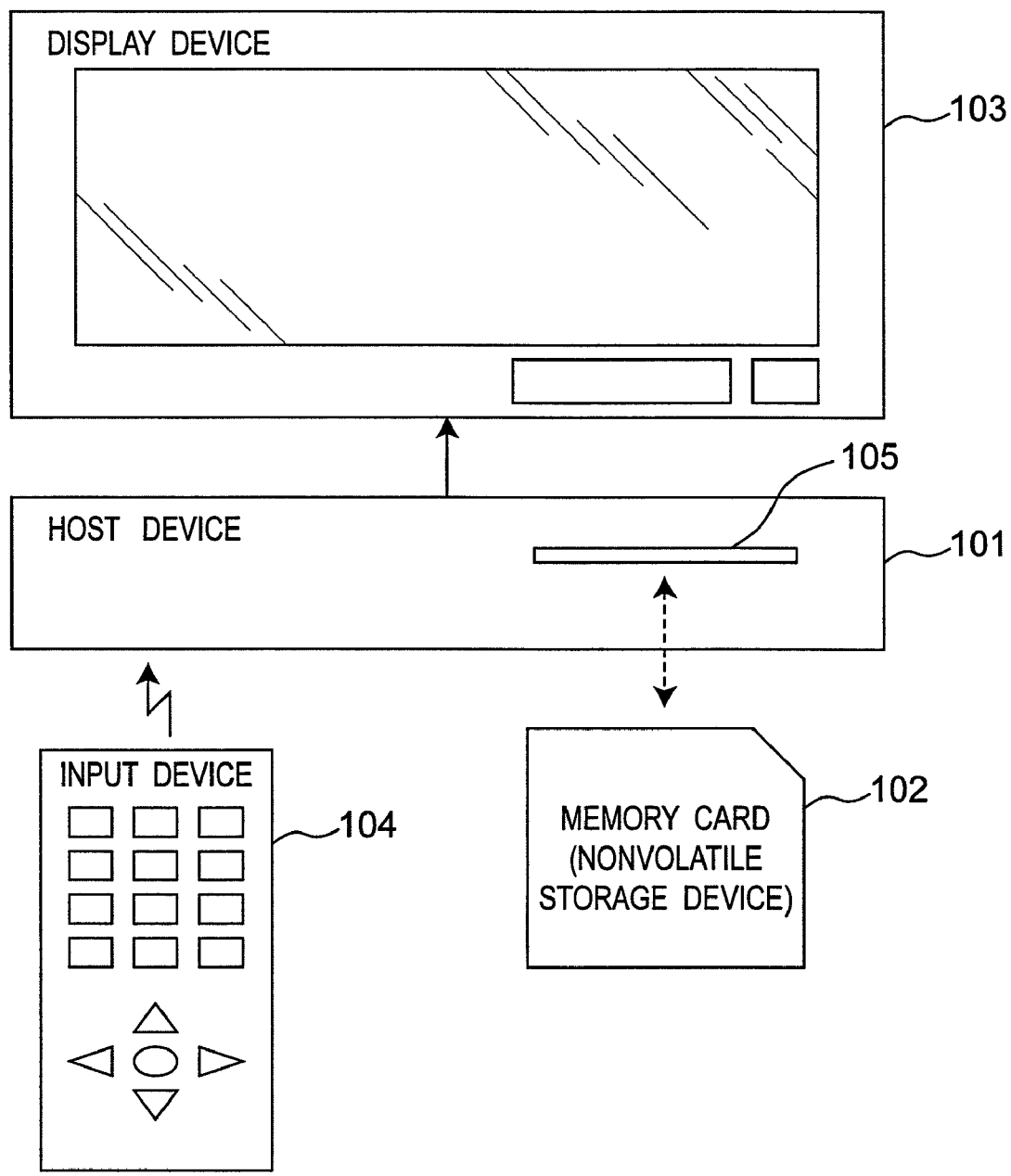
FIG. 1 is an overall view showing the configuration of a nonvolatile storage device system according to the present invention.

101 Host device
102, 802 Memory card
103 Display device
104 Input device
105 Memory card slot
201 Content display/input control unit
202 Host device-side protocol control/monitor unit
203 Memory card-side protocol control/monitor unit
204, 804 Content management unit 205 Meta data storage unit
206 Content data storage unit
207 Decoder unit
208 Content management GUI script generating unit
209 Host device capability storage unit
210, 810 Memory controller
800 Write status holding unit Best Mode for Carrying Out the Invention Embodiments of the present invention are described below with reference to the drawings. Incidentally, in each embodiment described below, the same component element is designated by the same reference numeral.
(Embodiment 1)

According to embodiment 1 of the present invention, a content management unit that manages the contents and a content management GUI script generating unit are arranged inside a memory card. These units are in charge of adding or deleting the contents and the meta data accompanying such contents, rewriting the data inside the meta data such as the Usage Rule and generating the content information display script. The greatest feature of embodiment 1 of the present invention is that the aforementioned unit permits the external host device connected to the memory card to unconsciously use the data management on the contents stored in the memory card.

Embodiment 1 of the present invention is described below with reference to the drawings.

FIG. 1 shows the configuration of the nonvolatile storage device system according to the present invention, in which the video/audio data are accumulated in a recording medium and managed.

In FIG. 1, 101 designates a host device, and 102 a nonvolatile storage device (a memory card in this case), which make up the main component elements of the nonvolatile storage device system. In this configuration, the host device 101 is such that a user can record the video data with voice or reproduce the video/audio contents of which the copyright is protected by encryption or the like. Also, the memory card 102 is a storage medium for storing the video/audio contents together with the meta data accompanying the contents.

In the host device 101, the memory card 102 providing a storage medium accessible at random can be mounted in a memory card slot 105. The host device 101 displays on a display device 103, such as a television, the video/audio contents stored in the memory card 102, from which the user can confirm the contents stored in the memory card 102. Further, the host device 101 can process the content data designated by the user using an input device 104 such as a remote controller.

Figure 2:
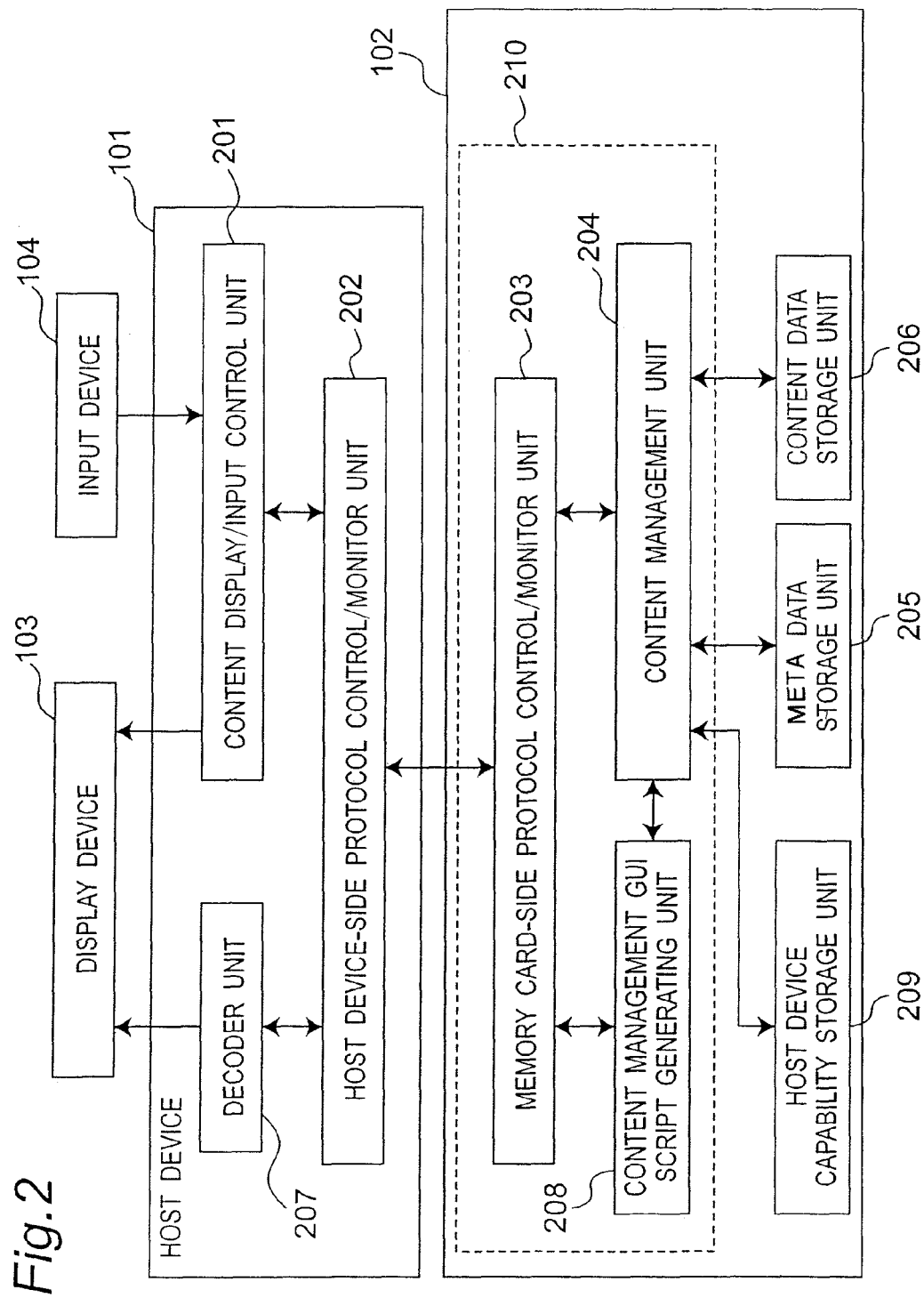
FIG. 2 is a block diagram showing a nonvolatile storage device system according to embodiment 1 of the present invention.

FIG. 2 is a block diagram showing the nonvolatile storage device system according to embodiment 1 of the present invention.

In FIG. 2, the memory card 102 is configured of a content data storage unit 206 that stores the video/audio content data, a meta data storage unit 205 that stores the meta data providing the data such as the copyright protection information, the shooting date/hour, the shooting place, the content producer and the content reproduction order accompanying the content data, the content management unit 204 that carries out the management of the content data and the meta data such as the storage/deletion of the content data and the change in the meta data accompanying the content such as the copyright protection information in response to the request from the host device 101, the content management GUI script generating unit 208 that generates the display script for displaying a list of the contents, a host device capability storage unit 209 that stores the processing capacity of the host device 101, and a protocol control/monitor unit 203 that converts to a command for establishing communication with the host device 101. The protocol control/monitor unit 203, the content management unit 204, and the content management GUI script generating unit 208 are collectively called a memory controller 210. Also, the host device capability storage unit 209, the meta data storage unit 205 and the content data storage unit 206 make up a storage area allocated in the nonvolatile memory such as a flash memory.

The host device 101 is configured of a protocol control/monitor unit 202 that converts to a command for establishing communication with the memory card 102, a content display/input control unit 201 that transmits the user input to the memory card 102 or notifying the contents from the memory card 102 to the display device 103, and a decoder unit 207 that decodes the content data and outputting the content data to the display device 103.

The host device 101 and the memory card 102 have many other component units. These components units, however, are not directly related to the present invention and not described.

FIG. 5 shows an example of the meta data accompanying the contents, stored in the meta data storage unit 205. This is a list of the content name (NAME), the type information (TYPE) describing whether the content is a moving image or music, etc. the subtype information (SUBTYPE) describing the encoding type of the moving image and the sound, the Usage Rule (DRM) for copyright protection and the encryption key (KEY). The contents having the content name Movie003, for example, is the moving image (MOVIE) encoded by MPEG2, is encrypted with the encryption key a1b3d45e and have the right to one more reproduction session (Play 1 time).

FIG. 6 shows the description of an example of the script for displaying the contents on the screen output by the host device 101, generated by the content management GUI script generating unit 208 based on the contents of the meta data stored in the meta data storage unit 205 shown in FIG. 5.

Figure 7:
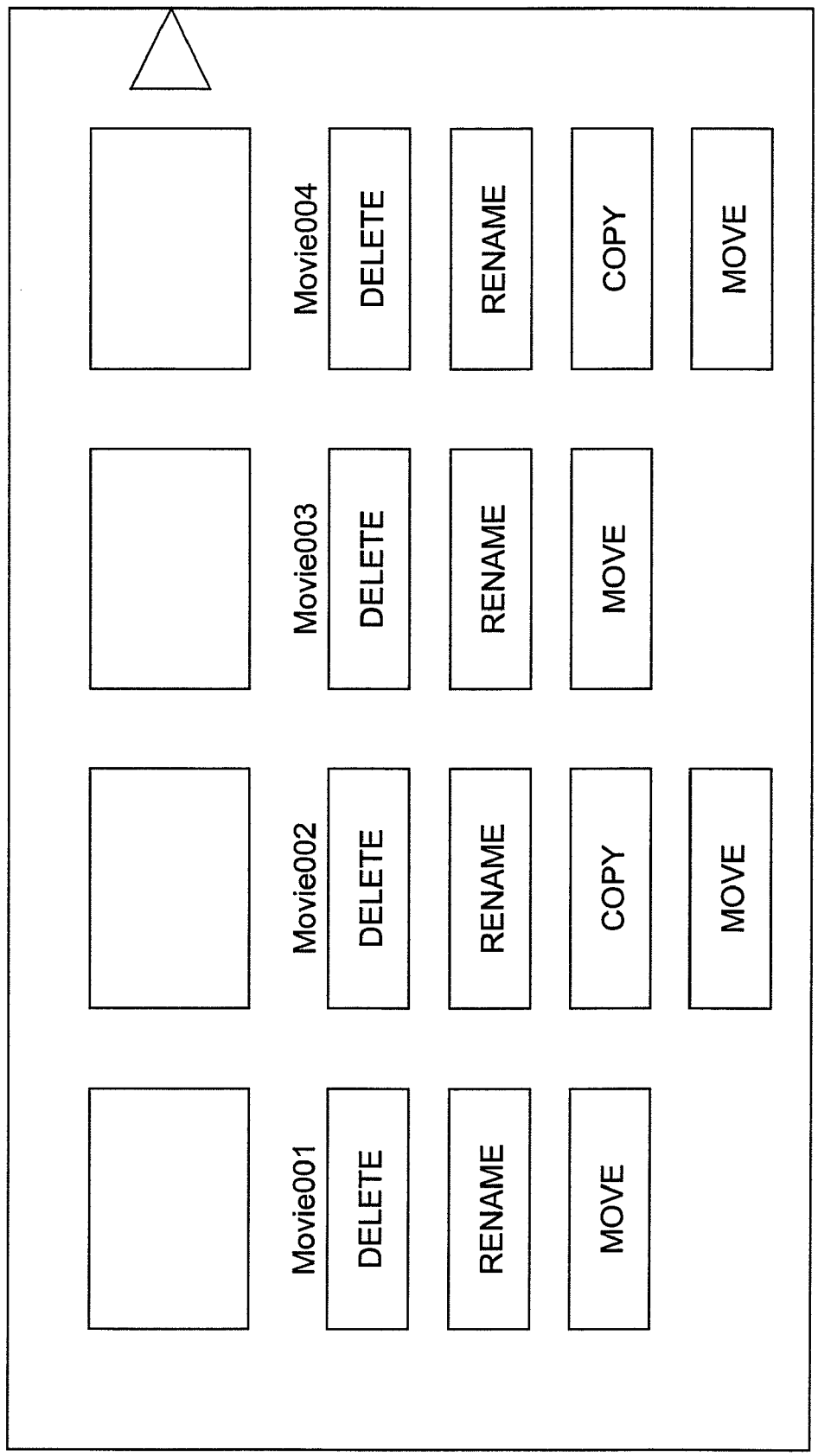
FIG. 7 is a schematic diagram showing an example of the content management GUI of the host device according to the present invention.

FIG. 7 shows an example of a case in which the content display script shown in FIG. 6 is interpreted by the content display/input control unit 201 and displayed on the display device 103. The thumbnail, the file name, the operable function, etc. of each content are displayed.

Figure 3:
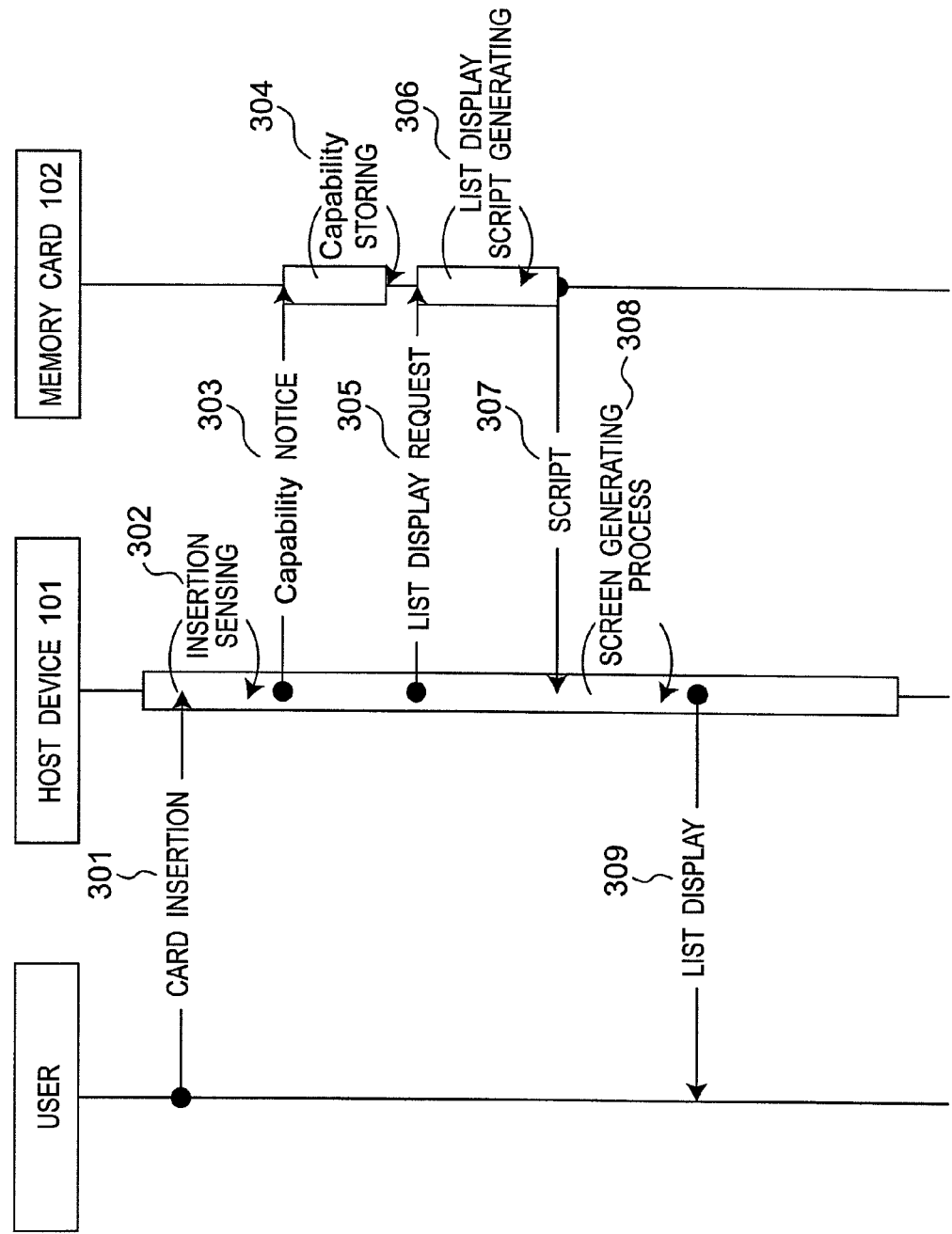
FIG. 3 is a flowchart showing the process before a user confirms, with a list on display, the contents stored in a memory card in the nonvolatile storage device system according to the present invention.

FIG. 3 shows the process from the step of inserting the memory card 102 into the memory card slot 105 of the host device 101 to the step of the user confirming, with a list on display, the contents stored in the memory card 102.

In FIG. 3, the user inserts the card into the memory card slot 105 of the host device 101 (step 301). The protocol control/monitor unit 202 on the host device side senses the insertion (step 302). After sensing the insertion, the content display/input control unit 201 notifies the memory card 102 of the capability (executable function and performance) of the host device 101 (step 303). The memory card 102 stores the capability of the host device 101 in the host device capability storage unit 209 (step 304). Next, the content display/input control unit 201 of the host device 101 requests the display of a list of the contents stored in the memory card 102 (step 305). The content management unit 204 of the memory card 102 selects, from the meta data of the contents stored in the meta data storage unit 205, the reproducible contents of the host device 101 based on the capability of the host device 101 stored in the host device capability storage unit 209. Then, the content management GUI script generating unit 208 generates the list display script described in FIG. 6 (step 306), and notifies the result of the script thus generated to the host device 101 side (step 307). The content display/input control unit 201 of the host device 101 side executes the screen generating process based on the notified script (step 308) and displays the list screen on the display device 103 (step 309).

With the process described above, the host device 101 can display a list of the contents stored in the memory card 102 without being conscious of the file format of the meta data or the copyright protection information.

Figure 4:
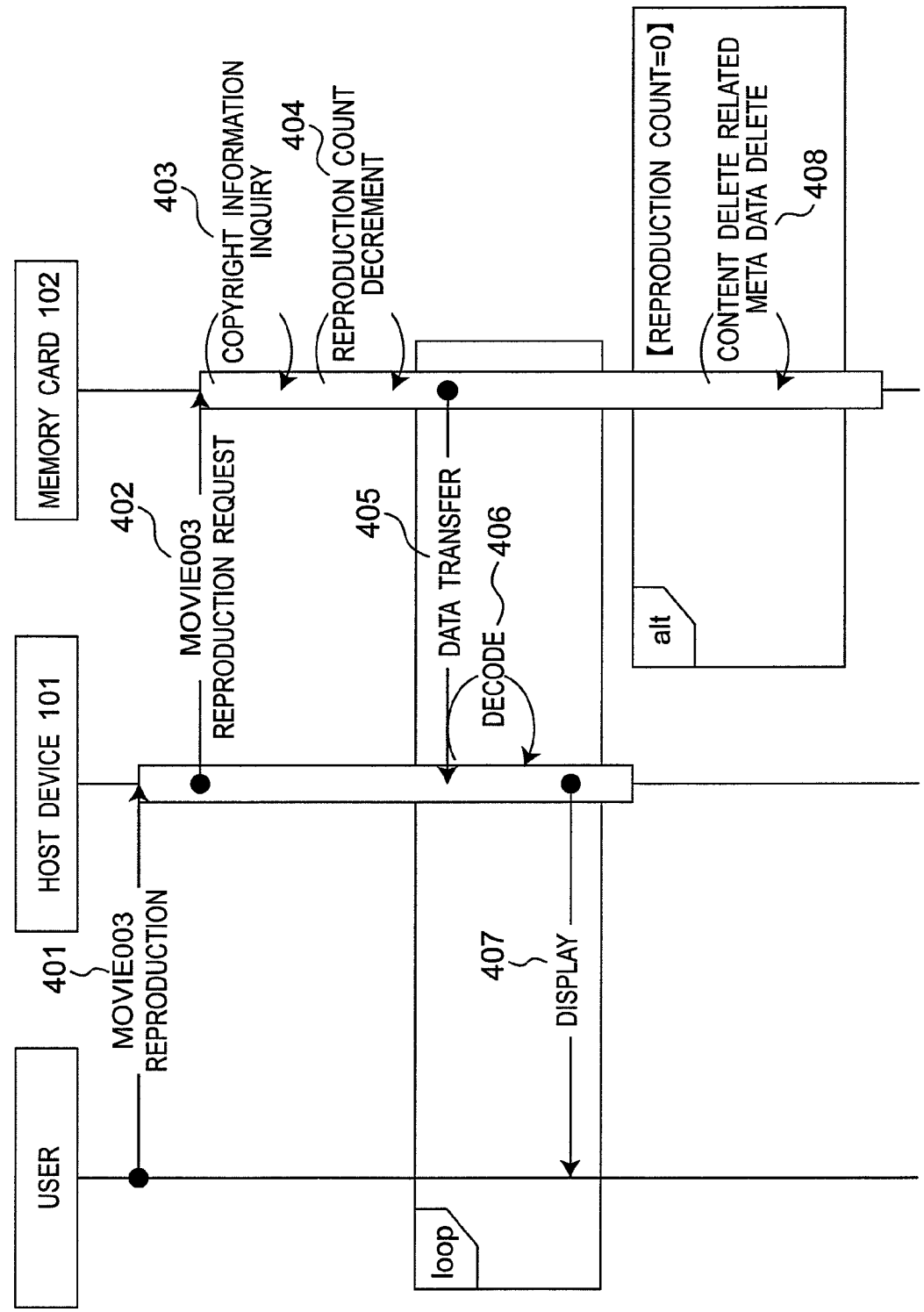
FIG. 4 is a flowchart showing the process from the step of reproducing the contents selected by the user from the list screen on display to the step of rewriting copyright protection information in the nonvolatile storage device system according to the present invention.

Also, FIG. 4 shows the process from the step of reproducing the contents (Movie003) selected by the user from the list screen display as shown in FIG. 7 to the step of rewriting the copyright protection information.

In FIG. 4, the user requests the reproduction of the desired content (in this case, Movie003) from the content list displayed on the display device 103 using the input unit of the input device 104 such as the remote controller (step 401). The host device 101 requests the memory card 102 to reproduce the content (Movie003) through the content display/input control unit 201 (step 402). First, the content management unit 204 of the meta card 102 makes an inquiry of the copyright protection information for Movie003 described in the memory data storage unit 205 (step 403) and decrements the reproduction count (step 404). After starting the reproduction, the content management unit 204 sequentially transfers the content stream data in the content data storage unit 206 to the host device 101 (step 405). The host device 101 decodes the transferred video data in the decoder unit 207 (step 406) and outputs the result to the display device 103 (step 407). Until the end of reproduction, steps 405 to 407 are repeated. After the reproduction, the content management unit 204 confirms the reproduction count on the meta data storage unit 205, and in the case where the reproduction count is 0, deletes the content data or the like from the content data storage unit 206 and the meta data storage unit 205.

The provision of the content management unit 204 in the memory controller 210 and the execution of the process described above makes it possible to reduce the matching check not originally required, which otherwise might be required due to the difference in the recording method or the error resolving method of the content management unit included in the host device side.

Also, the host device 101 can execute the reproduction and the process of copyright protection of the contents stored in the memory card 102, without being conscious of the file format of the meta data and the copyright protection information.

Incidentally, according to embodiment 1 described above, the memory card is used as an example of the storage medium. Nevertheless, the present invention is applicable also to such media as a randomly accessible storage medium including the optical media and the hard disk drive.

Also, according to embodiment 1, a list of the data in the memory card is displayed, the video is reproduced or the copyright protection information rewritten based on the copyright protection information, and the content data is deleted. Nevertheless, the invention is applicable also to the data management such as the storage of the contents and the accompanying meta data in the memory card or the search of the contents based on the meta data, which are carried out conventionally on the host device side.

(Embodiment 2)

Figure 8:
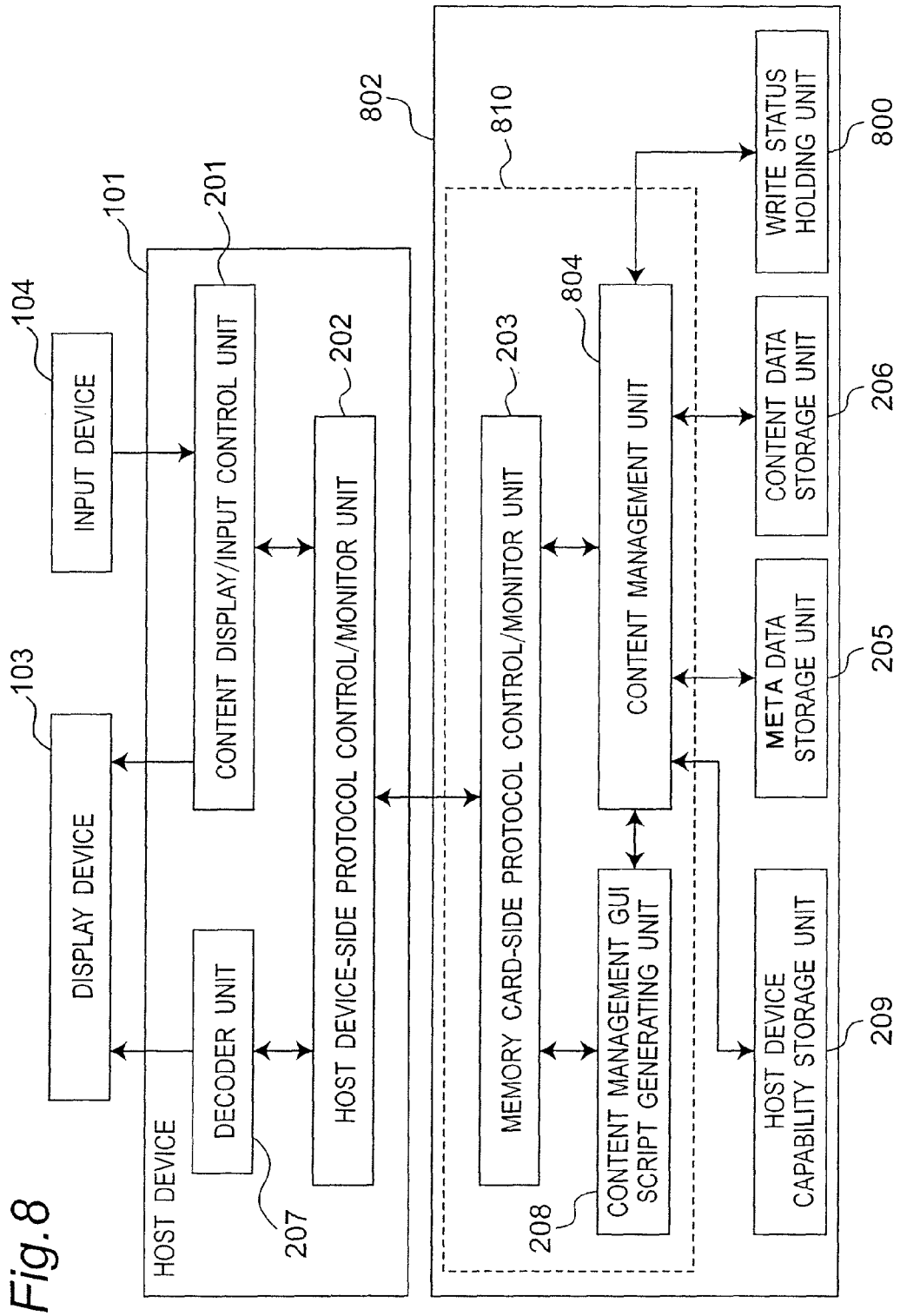
FIG. 8 is a block diagram showing the nonvolatile storage device system according to embodiments 2 and 3 of the present invention.

FIG. 8 is a block diagram showing a nonvolatile storage device system according to embodiment 2 of the invention. The nonvolatile storage device system according to this embodiment, as compared with the nonvolatile storage device system according to embodiment 1 shown in FIG. 2, is wherein the memory card 802 further includes a write status holding unit 800 that holds the write status for identifying the content data being written.

In FIG. 8, the memory card 802 includes a content data storage unit 206, a meta data storage unit 205, a content management unit 804 that carries out the management of the content data and the meta data such as the storage/deletion of the content data and the content change of the meta data accompanying the contents such as the copyright protection information while at the same time writing the content ID in the write status holding unit 800, a content management GUI script generating unit 208, a host device capability storage unit 209, and a protocol control/monitor unit 203. The protocol control/monitor unit 203, the content management unit 804, and the content management GUI script generating unit 208 are collectively called a memory controller 810. Also, the host device capability storage unit 209, the meta data storage unit 205, the content data storage unit 206 and the write status holding unit 800 make up a storage area allocated in the nonvolatile memory such as a flash memory. The configuration of the nonvolatile storage device system according to embodiment 2 shown in FIG. 8 is similar to that of the nonvolatile storage device system according to embodiment 1 shown in FIG. 2, except for the write status holding unit 800 and the content management unit 804, and therefore, not described again.

The operation of the nonvolatile storage device system configured as described above is described. Incidentally, the basic operation is similar to that of the nonvolatile storage device system according to embodiment 1. Therefore, the difference from the nonvolatile storage device system according to embodiment 1, i.e. the error resolving method when the power interruption occurs during a series of the write operations for the content data and the meta data on the content data is described here.

Figure 9:
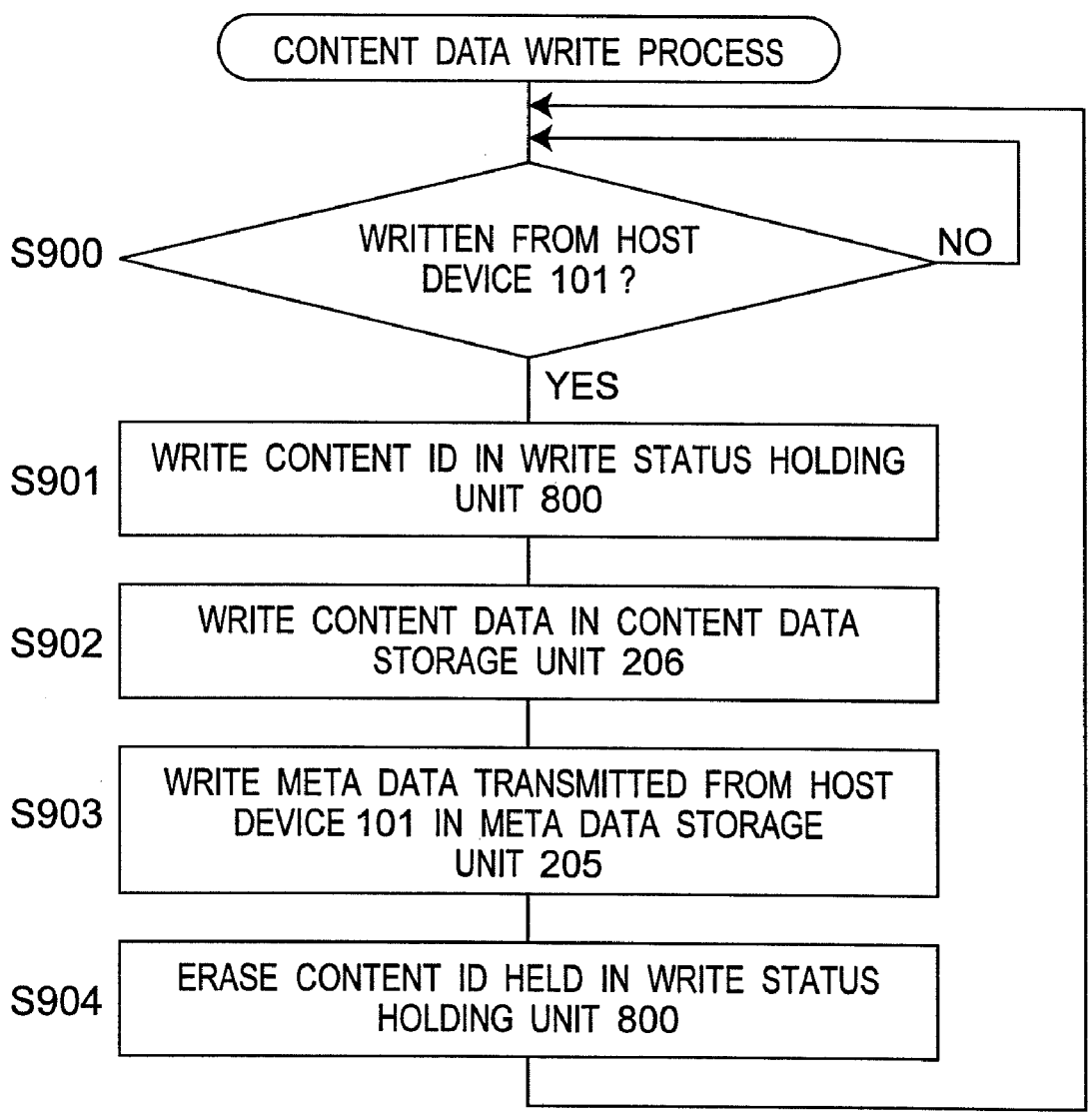
FIG. 9 is a flowchart showing a content data write process according to embodiments 2 and 3 of the present invention.
Figure 10:
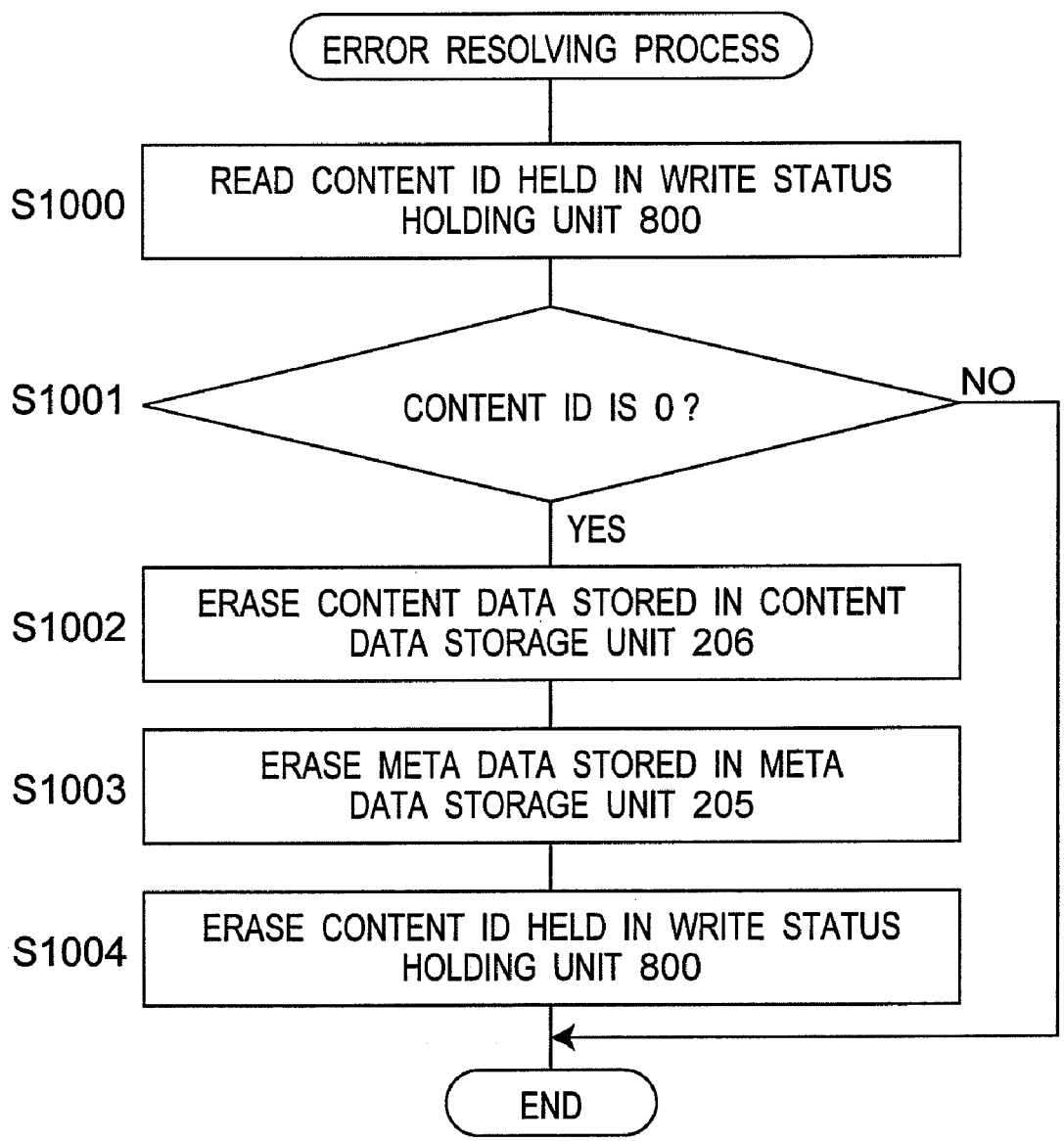
FIG. 10 is a flowchart showing an error resolving process according to embodiment 2 of the present invention.

The content management unit 804 executes the process of writing the content data in accordance with the flowchart of FIG. 9, and executes the error resolving process in accordance with the flowchart of FIG. 10 in the initialization process at the time of power-on. Also, the content ID for identifying the content data is temporarily written in the write status holding unit 800 during the process of writing the content data or the like.

In FIG. 9, the content ID, the content data and the meta data are transferred in accordance with a write command from the host device 101 (S900). Then, the content management unit 804 writes the content ID in the write status holding unit 800 (S901), and then writes the content data in the content data storage unit 206 (S902), so that the meta data transferred from the host device 101 with this content data is written in the meta data storage unit 205 (S903). Finally, the content ID held in the write status holding unit 800 is erased (S904), and the process returns to the write command waiting mode (S900). Incidentally, the content ID held in the write status holding unit 800 assumes an integer value other than 0.

At the normal end of the content data writing process as described above, the content ID is erased in S904, and therefore, the value thereof is 0. In the case where the content data writing process ends abnormally due to the power interruption or the like, on the other hand, the content ID is left.

In the case where the error such as the power interruption occurs in the writing process described above, the error resolving process shown in FIG. 10 is executed in the initialization process at the time of next power-on. In FIG. 10, the content management unit 804 first reads the content ID held in the write status holding unit 800 (S1000). Whether the content ID is 0 or not is judged (S1001). When the content ID is 0 (Yes in S1001), it is judged that the process of step S904 shown in FIG. 9 described above has been executed, i.e. both the content data and the meta data on the content data are correctly written, and the error resolving process is terminated.

In the case where the content ID is other than 0 (No in S1001), on the other hand, it is judged that the process of S904 of FIG. 9 described above has failed to be executed due to the power interruption or the like, i.e. that the content data and the meta data on the content data have been failed to be written correctly. In this case, after erasing the content data stored in the content data storage unit 206 (S1002), the meta data stored in the meta data storage unit 205 is erased (S1003) thereby to invalidate both the content data and the meta data. After that, the content ID held in the write status holding unit 800 is erased (S1004) thereby to end the error resolving process.

As described above, the content management unit 804 of the memory card 802 judges, based on the content ID held in the write status holding unit 800, whether the error such as the power interruption has occurred during the write operation of the content data and the meta data, and in the case where an error has occurred, both the content data and the meta data stored already in the memory card 802 are erased (invalidated), by judging that the matching may not be maintained between the content data and the meta data. Thereby it is possible to maintain the matching between the content data and the meta data.

(Embodiment 3)

The nonvolatile storage device system according to another embodiment of the invention is described. The configuration of the nonvolatile storage device system according to this embodiment is similar to that of the nonvolatile storage device system according to embodiment 2 and therefore not described again.

The operation of the nonvolatile storage device system according to this embodiment is described. Incidentally, the basic operation is similar to that of the nonvolatile storage device system according to embodiment 2. Therefore, the difference from the nonvolatile storage device system according to embodiment 2, i.e. an error resolving method when the power interruption occurs during a series of the write operations for the content data and the meta data on the content data is described here.

In the nonvolatile storage device system according to embodiment 2, both the content data and the meta data are erased and invalidated at the time of an error. The nonvolatile storage device system according to this embodiment, in contrast, is characterized in that, at the time of an error, both the content data and the meta data are written and validated by the retransmitted data in the case where the host device 101 is capable of retransmission, while the invalidation process described above is executed in the case where the host device 101 is incapable of retransmission.

Figure 11:
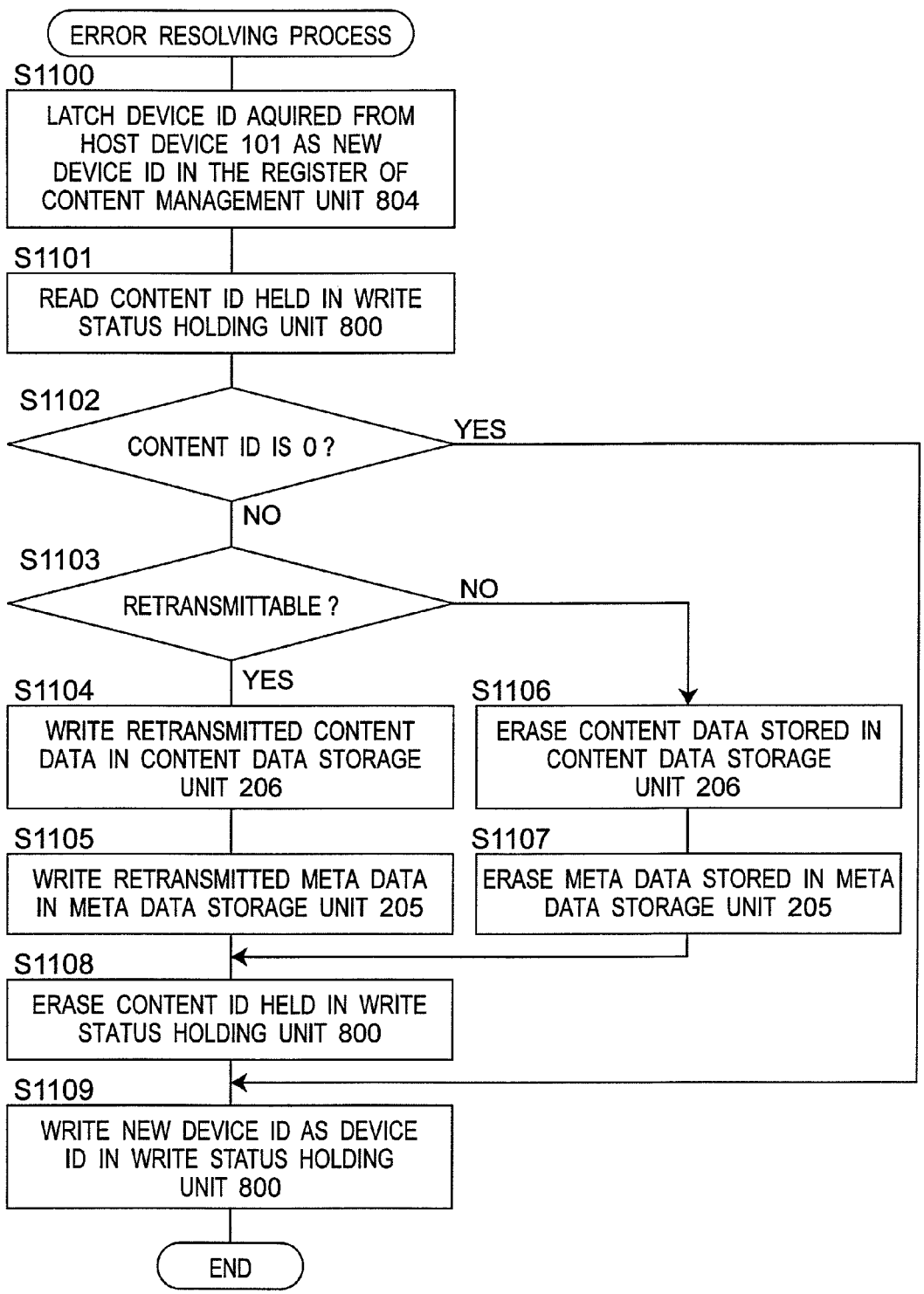
FIG. 11 is a flowchart showing an error resolving process according to embodiment 3 of the present invention.
Figure 12:
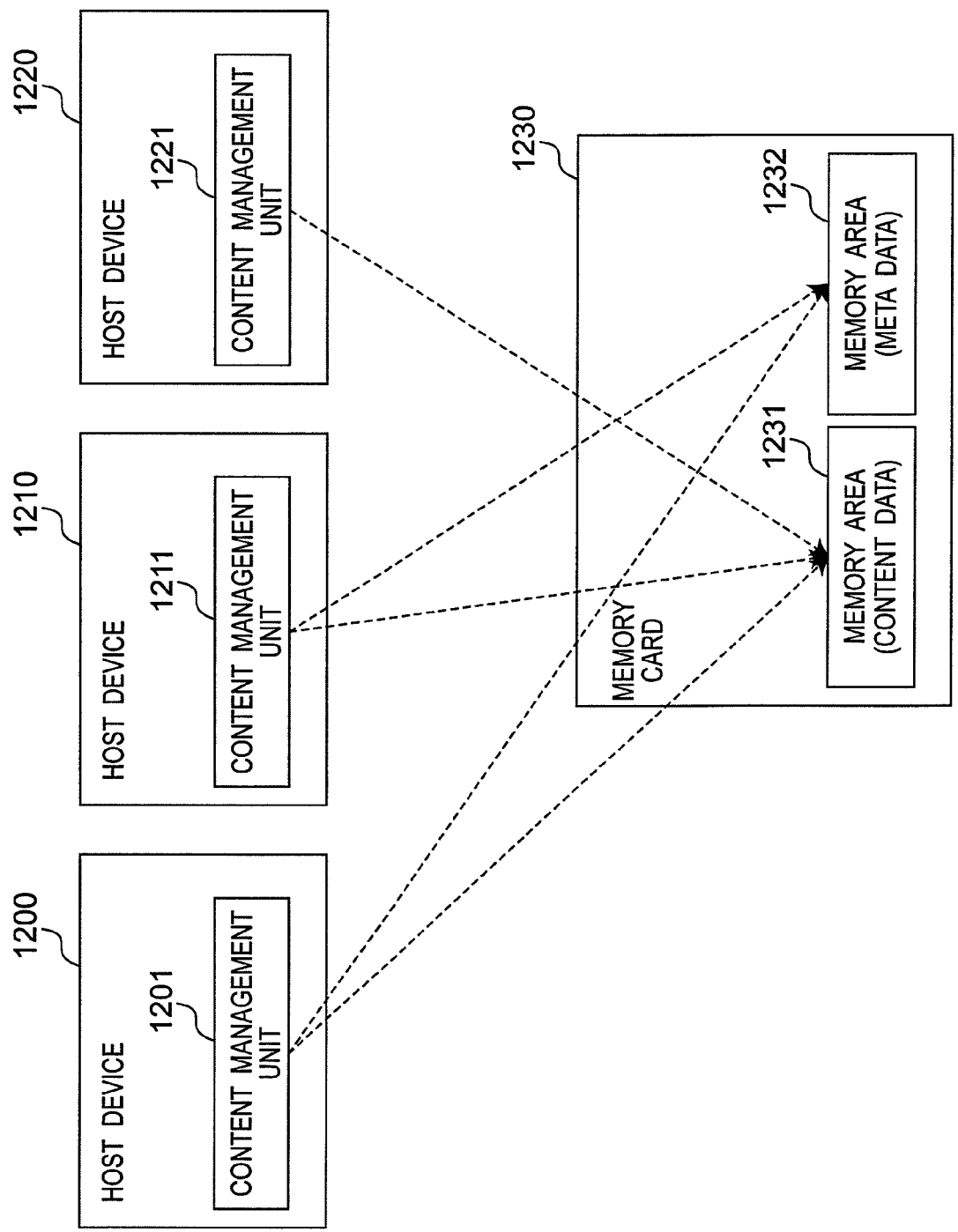
FIG. 12 is a block diagram showing the configuration of the conventional nonvolatile storage device system.

The content management unit 804 executes the process of writing the content data in accordance with the flowchart shown in FIG. 9, and in the initialization process at the time of power-on, carries out the error resolving process in accordance with the flowchart of FIG. 11. Also, in the write status holding unit 800, the content ID is temporarily written to identify the content data during the write operation of the content data or the like on the one hand, and the device ID to identify the host device 101 acquired from the host device 101 is temporarily written at the end (in S1109 described later) of the error resolving process in the initialization process on the other hand. The writing process of the content data is similar to that shown in the flowchart of embodiment 2 and therefore not described again.

In FIG. 11, the content management unit 804 first latches the device ID acquired from the host device 101, in the register thereof as a new device ID (S1100). Next, the content ID held in the write status holding unit 800 is read (S1101). Whether the content ID is 0 or not is judged (S1102). When the content ID is 0 (Yes in S1102), it is judged that the process of step S904 shown in FIG. 9 described above has been executed, i.e. both the content data and the meta data on the content data have been correctly written, and the control proceeds to step S1109. Incidentally, the content ID held in the write status holding unit 800 assumes an integer value other than 0.

In the case where the content ID is other than 0 (No in S1102), on the other hand, it is judged that the process of S904 of FIG. 9 described above has failed to be executed due to the power interruption or the like, i.e. that the content data and the meta data on the content data have been failed to be written correctly. In this case, the content management unit 804 specifies the content data of which the error is to be resolved, based on the content ID that has been read.

The host device 101 judges whether the content data and the meta data of which an error is to be resolved can be retransmitted or not (S1103). Specifically, when it is judged that (a) the host device 101 is identical to the host device before the power interruption, (b) the host device 101 has a buffer, and (c) the host device 101 is not powered off or the buffer for temporarily holding the contents is accumulated in the nonvolatile memory in the host device, it is judged that the host device 101 is capable of retransmission. More specifically, in (a), the content management unit 804 judges by comparing the new device ID latched in the register with the device ID of the host device before the power interruption, held in the write status holding unit 800 in step S1109 described later. In (b), the content management unit 804 makes an inquiry to the host device 101 through the protocol control/monitor unit 203 on memory card side whether it has the buffer (configured of SRAM or the like) for temporarily holding the content data or the like already transferred by the host device 101, and judgment is made based on the response thereto. In (c), as in (b), the content management unit 804 makes an inquiry to the host device 101 whether the content data or the like held in the buffer of the host device 101 still remains without being volatilized even after the error such as the power interruption, and judgment is made based on the response thereto.

In the case where the retransmission is possible (Yes in S1103), the content management unit 804 requests the host device 101 to retransmit the content data and the meta data. Further, after the retransmitted content data is written in the content data storage unit 206 (S1104), the retransmitted meta data is written in the meta data storage unit 205 (S1105). In the case where the retransmission is impossible (No in S1103), on the other hand, the content data stored in the content data storage unit 206 is erased (S1106), and after the meta data stored in the meta data storage unit 205 is erased (S1107), both the content data and the meta data are invalidated.

After the process of S1105 and S1107, the content ID held in the write status holding unit 800 is erased (S1108), and the new device ID latched in the register of the content management unit 804 is written in the write status holding unit 800 as a device ID (S1109) thereby to end the error resolving process.

As described above, the content management unit 804 of the memory card 802 judges whether the error such as the power interruption has occurred during the write operation of the content data and the meta data, based on the content ID held in the write status holding unit 800, and in the case where an error has so occurred, by judging that the matching may not be maintained between the content data and the meta data, requests the host device 101 to retransmit the content data and the meta data, and records both the content data and the meta data thus retransmitted, or erases (invalidates) both the content data and the meta data stored already in the memory card 802. Thereby it is possible to maintain the matching between the content data and the meta data.

Incidentally, according to embodiments 2 and 3 described above, the write status holding unit 800, like the content data storage unit 206, is a storage area allocated in a nonvolatile memory such as a flash memory. Nevertheless, the write status holding unit 800 may alternatively be another nonvolatile memory than the flash memory. Also, the write status holding unit 800 may be located in the memory controller 810.

Incidentally, according to embodiments 2 and 3 described above, the content ID held in the write status holding unit 800, though assumed to be an integer other than 0, may be in any form such as a character string or a binary data, by which the contents can be uniquely identified.

Incidentally, according to embodiments 2 and 3 described above, the content ID and the content data are sent from the host device 101. As an alternative, however, only the content data and the meta data may be sent from the host device 101 with the write command, and in the process, the content management unit 804 may attach a unique content ID in the memory card 802.

Incidentally, in the error resolving process of S1104 and S1105 according to embodiment 3 described above, the content management unit 804 may rewrite all the retransmitted data from the first to the last or may additionally write only an anomalous part.

The nonvolatile storage device system according to embodiment 3 executes the error resolving process by validating or invalidating both the content data and the meta data. Further, in S902 and S903 of FIG. 9, each of the content data and the meta data can be independently checked to resolve the error, by holding the flags or the like for identifying the completion of the write operation of the content data and the meta data respectively, in the write status holding unit 800. As a result, the timelike overhead for the retransmission process from the host device 101 can be further reduced.

As described above, the provision of the content management unit 804 in the memory controller 810 makes it possible to reduce the matching check not originally required, which otherwise might be required due to the difference in the recording method or the error resolving method of the content management unit conventionally included in the host device 101 side. Further, based on the content ID held in the write status holding unit 800, the matching is checked between the content data corresponding to the content ID and the meta data on such content data. As a result, simply by reading one content ID held in the write status holding unit 800, the presence or absence of the error such as the power interruption can be judged. Further, even in the case where an error occurs, the content data and the meta data which are written at the time of the error occurrence and which are highly likely to develop a mismatch can be specified by the content ID, and therefore, the error can be resolved within a short time. As a result, the starting time from the power-on till when the shooting becomes possible can be shortened. Also, by holding the device ID in the write status holding unit 800, the error can be resolved by retransmitting the content data or the like at the time of occurrence of the error, and therefore, the chance of losing the valuable data is reduced, and the extraneous labor such as the repeated shooting operation is eliminated.

Industrial Applicability

The nonvolatile storage device system according to the present invention, which proposes a method quick in starting time and capable of providing a GUI shared by users, is usefully applicable to a still image recording and reproducing apparatus or a moving image recording and reproducing apparatus or a portable telephone using the nonvolatile storage device such as a semiconductor memory card.

The invention claimed is:

1. A memory controller provided in a nonvolatile storage device with a nonvolatile memory, for reading and writing content data and meta data on the content data in accordance with an access command from an external host device, which is external of the memory controller and the nonvolatile memory, the memory controller comprising:
    a content manager, embodied by a processor, that manages the content data and the meta data;
    wherein the content manager eliminates mismatch between the content data and the meta data on the content data, based on write status information which is stored in the nonvolatile memory for identifying content data being written, and
    wherein, upon judgment based on the write status information, that the content data and the meta data on the content data stored in the nonvolatile memory may be mismatched, the content manager requests retransmission of the content data and the meta data to the external host device and writes the content data and the meta data retransmitted from the external host device in response to the retransmission request when the external host device is capable of retransmission, and deletes the content data and the meta data stored in the nonvolatile memory when the external host device is incapable of retransmission,
    wherein the write status information stored in the nonvolatile memory comprises a content ID and a device ID,
    wherein the content manager detects the mismatch between the content data and the meta data on the content data, by checking whether the nonvolatile memory includes the content ID, and
    wherein the content manager determines whether the external host device is capable of retransmission, by checking whether a current device ID of the content data for which the mismatch between the content data and the meta data on the content data is detected, matches the device ID stored in the nonvolatile memory.

2. A memory controller provided in a nonvolatile storage device with a nonvolatile memory, for reading and writing content data and meta data on the content data in accordance with an access command from an external host device, which is external of the memory controller and the nonvolatile memory, the memory controller comprising:
    a write status storage that holds write status information for identifying content data being written; and
    a content manager, embodied by a processor, that manages the content data and the meta data;
    wherein the content manager eliminates mismatch between the content data and the meta data on the content data based on the write status information, and
    wherein, upon judgment based on the write status information, that the content data and the meta data on the content data stored in the nonvolatile memory may be mismatched, the content manager requests retransmission of the content data and the meta data to the external host device and writes the content data and the meta data retransmitted from the external host device in response to the retransmission request when the host device is capable of retransmission, and deletes the content data and the meta data stored in the nonvolatile memory when the host device is incapable of retransmission, wherein the write status information stored in the write status storage comprises a content ID and a device ID, wherein the content manager detects the mismatch between the content data and the meta data on the content data, by checking whether the write status storage includes the content ID, and wherein the content manager determines whether the external host device is capable of retransmission, by checking whether a current device ID of the content data for which the mismatch between the content data and the meta data on the content data is detected, matches the device ID stored in the write status storage.

3. The memory controller as claimed in claim 1, further comprising a GUI script generator that generates a script describing screen display contents in accordance with the request from the external host device for the content data.

4. A nonvolatile storage device for reading and writing content data and meta data on the content data in accordance with an access command from an external host device, which is external of the memory controller and the nonvolatile memory, the memory controller comprising:

a nonvolatile memory that stores the content data, the meta data, and write status information for identifying content data being written; and a memory controller that reads and writes the content data and the meta data from and into the nonvolatile memory, wherein the memory controller includes a content manager that manages the content data and the meta data, and the content manager eliminates mismatch between the content data and the meta data on the content data based on the write status information, and wherein, upon judgment based on the write status information, that the content data and the meta data on the content data stored in the nonvolatile memory may be mismatched, the content manager requests retransmission of the content data and the meta data to the external host device and writes the content data and the meta data retransmitted from the external host device in response to the retransmission request when the external host device is capable of retransmission, and deletes the content data and the meta data stored in the nonvolatile memory when the external host device is incapable of retransmission, wherein the write status information stored in the nonvolatile memory stores a content ID and a device ID, wherein the content manager detects the mismatch between the content data and the meta data on the content data, by checking whether the nonvolatile memory includes the content ID, and wherein the content manager determines whether the external host device is capable of retransmission, by checking whether a current device ID of the content data for which the mismatch between the content data and the meta data on the content data is detected, matches the device ID stored in the nonvolatile memory.

5. A nonvolatile storage device for reading and writing content data and meta data on the content data in accordance with an access command from an external host device, which is external of the memory controller and the nonvolatile memory, the memory controller comprising:

a nonvolatile memory that stores the content data and the meta data; and a memory controller that reads and writes the content data and the meta data from and into the nonvolatile memory;

wherein the memory controller includes a write status storage that stores write status information for identifying content data being written and a content manager that manages the content data and the meta data, wherein the content manager eliminates mismatch between the content data and the meta data on the content data based on the write status information, and wherein, upon judgment based on the write status information, that the content data and the meta data on the content data stored in the nonvolatile memory may be mismatched, the content manager requests retransmission of the content data and the meta data to the external host device and writes the content data and the meta data retransmitted from the external host device in response to the retransmission request when the host device is capable of retransmission, and deletes the content data and the meta data stored in the nonvolatile memory when the host device is incapable of retransmission, wherein the write status information stored in the write status storage comprises a content ID and a device ID, wherein the content manager detects the mismatch between the content data and the meta data on the content data, by checking whether the write status storage includes the content ID, and wherein the content manager determines whether the external host device is capable of retransmission, by checking whether a current device ID of the content data for which the mismatch between the content data and the meta data on the content data is detected, matches the device ID stored in the write status storage.

6. The nonvolatile storage device as claimed in claim 4, wherein the memory controller further includes a GUI script generator that generates a script describing screen display contents in accordance with the request from the external host device for the content data.

7. A nonvolatile storage system comprising a host device, and a nonvolatile storage device for reading and writing content data and meta data on the content data in accordance with an access command from the host device;

wherein the nonvolatile storage device includes a nonvolatile memory that stores the content data, the meta data and write status information for identifying content data being written and a memory controller that reads and writes the content data and the meta data from and into the nonvolatile memory, wherein the memory controller includes a content manager that manages the content data and the meta data; and wherein the content manager eliminates mismatch between the content data and the meta data on the content data based on the write status information, wherein, upon judgment based on the write status information, that the content data and the meta data on the content data stored in the nonvolatile memory may be mismatched, the content manager requests retransmission of the content data and the meta data to the host device and writes the content data and the meta data retransmitted from the host device in response to the retransmission request when the host device is capable of retransmission, and deletes the content data and the meta data stored in the nonvolatile memory when the external host device is incapable of retransmission, wherein the write status information stored in the nonvolatile memory comprises a content ID and a device ID, wherein the content manager detects the mismatch between the content data and the meta data on the content data, by checking whether the nonvolatile memory includes the content ID, and wherein the content manager determines whether the host device is capable of retransmission, by checking whether a current device ID of the content data for which the mismatch between the content data and the meta data on the content data is detected, matches the device ID stored in the nonvolatile memory.

8. A nonvolatile storage system comprising a host device, and a nonvolatile storage device for reading and writing content data and meta data on the content data in accordance with an access command from the host device;

wherein the nonvolatile storage device includes a nonvolatile memory that stores the content data and the meta data and a memory controller that reads and writes the content data and the meta data from and into the nonvolatile memory;

wherein the memory controller includes a write status storage that stores write status information for identifying content data being written and a content manager that manages the content data and the meta data; and wherein the content manager eliminates mismatch between the content data and the meta data on the content data based on the write status information, and wherein, upon judgment based on the write status information, that the content data and the meta data on the content data stored in the nonvolatile memory may be mismatched, the content manager requests retransmission of the content data and the meta data to the host device and writes the content data and the meta data retransmitted from the host device in response to the retransmission request when the host device is capable of retransmission, and deletes the content data and the meta data stored in the nonvolatile memory when the host device is incapable of retransmission, wherein the write status information stored in the write status storage comprises a content ID and a device ID, the content manager detects the mismatch between the content data and the meta data on the content data, by checking whether the write status storage includes the content ID, and the content manager determines whether the host device is capable of retransmission, by checking whether a current device ID of the content data for which the mismatch between the content data and the meta data on the content data is detected, matches the device ID stored in the write status storage.

9. The nonvolatile storage system as claimed in claim 7, wherein the memory controller further includes a GUI script generator that generates the script describing screen display contents in accordance with the request from the host device for the content data.

10. The memory controller as claimed in claim 2, further comprising a GUI script generator that generates a script describing screen display contents in accordance with the request from the external host device for the content data.

11. The nonvolatile storage device as claimed in claim 5, wherein the memory controller further includes a GUI script generator that generates a script describing screen display contents in accordance with the request from the external host device for the content data.

12. The nonvolatile storage system as claimed in claim 8, wherein the memory controller further includes a GUI script generator that generates the script describing screen display contents in accordance with the request from the host device for the content data.

13. The memory controller according to claim 1, wherein the content manager further determines whether the external host device of the current device ID has a buffer, and at least one of whether the external host device of the current device ID is not powered off and whether the buffer is provided in a nonvolatile memory in the external host device.

14. The memory controller according to claim 2, wherein the content manager further determines whether the external host device of the current device ID has a buffer, and at least one of whether the external host device of the current device ID is not powered off and whether the buffer is provided in a nonvolatile memory in the external host device, in order to determine whether the external host device is capable of retransmission.

15. The nonvolatile storage device according to claim 4, wherein the content manager further determines whether the external host device of the current device ID has a buffer, and at least one of whether the external host device of the current device ID is not powered off and whether the buffer is provided in a nonvolatile memory in the external host device.

16. The nonvolatile storage device according to claim 5, wherein the content manager further determines whether the external host device of the current device ID has a buffer, and at least one of whether the external host device of the current device ID is not powered off and whether the buffer is provided in a nonvolatile memory in the external host device, in order to determine whether the external host device is capable of retransmission.

17. The nonvolatile storage system according to claim 7, wherein the content manager further determines whether the host device of the current device ID has a buffer, and at least one of whether the host device of the current device ID is not powered off and whether the buffer is provided in a nonvolatile memory in the host device.

18. The nonvolatile storage system according to claim 8, wherein the content manager further determines whether the host device of the current device ID has a buffer, and at least one of whether the host device of the current device ID is not powered off and whether the buffer is provided in a nonvolatile memory in the host device, in order to determine whether the external host device is capable of retransmission.

* * * * *